United States Patent
Bromley

(10) Patent No.: US 12,441,142 B1
(45) Date of Patent: Oct. 14, 2025

(54) ADJUSTABLE KNUCKLE INCLUDING A CAM BOLT FOR A VEHICLE SUSPENSION SYSTEM

(71) Applicant: GM GLOBAL TECHNOLOGY OPERATIONS LLC, Detroit, MI (US)

(72) Inventor: Braden Joseph Bromley, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/923,794

(22) Filed: Oct. 23, 2024

(51) Int. Cl.
*B60G 3/26* (2006.01)

(52) U.S. Cl.
CPC .......... *B60G 3/265* (2013.01); *B60G 2200/17* (2013.01); *B60G 2200/422* (2013.01); *B60G 2200/464* (2013.01)

(58) Field of Classification Search
CPC ............... B60G 2200/464; B60G 3/26; B60G 2200/17; B60G 2200/46; B60G 2200/462; B62D 21/02; B62D 17/00
USPC .......................... 280/124.134, 5.521, 86.751
See application file for complete search history.

(56) References Cited

U.S. PATENT DOCUMENTS

| | | | | |
|---|---|---|---|---|
| 4,418,938 A * | 12/1983 | Sullivan | ................. | B60G 15/07 280/86.753 |
| 5,647,606 A * | 7/1997 | Jordan | ................... | B62D 17/00 280/86.751 |
| 6,027,130 A * | 2/2000 | Kawabe | ................. | B60G 3/265 280/124.135 |
| 11,772,442 B2 * | 10/2023 | Verbridge | ................ | B62D 7/18 280/93.512 |
| 11,845,316 B1 | 12/2023 | Miller et al. | | |

FOREIGN PATENT DOCUMENTS

| | | | | |
|---|---|---|---|---|
| DE | 29610634 U1 | 10/1996 | | |
| EP | 0255921 A2 * | 2/1988 | ............. | B62D 17/00 |

OTHER PUBLICATIONS

German Office Action from counterpart DE1020241387521, dated May 23, 2025.

* cited by examiner

*Primary Examiner* — Paul N Dickson
*Assistant Examiner* — Caitlin Anne Miller

(57) ABSTRACT

A suspension knuckle includes an upper member including a first end and a second end. The upper member includes a first opening at the second end and a second opening arranged between the first end and the second end. A lower member includes a first end portion and a second end portion. The lower member includes a first passage arranged at the second end portion and a second passage arranged between the first end portion and the second end portion. A first fastener connects the upper member and the lower member and passes through the first passage and the second opening. The first fastener defines a pivot point of the suspension knuckle. A second fastener passes through the second passage and the first opening. The second fastener connects the upper member and the lower member and establishes an amount of pivot of the upper member relative to the lower member.

20 Claims, 8 Drawing Sheets

ADJUSTABLE KNUCKLE INCLUDING A CAM BOLT FOR A VEHICLE SUSPENSION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to the art of vehicle suspension systems and, more particularly, to an adjustable knuckle including a cam bolt for camber adjustment.

Vehicle suspension systems may accommodate a number of adjustments that can impact ride quality, handling characteristics/responsiveness, and tire wear. Vehicle wheels can be angled about, or relative to, the vertical axis in order to adjust driving and steering characteristics. For example, suspension systems include a camber angle adjustment which sets the angle of a wheel relative to its vertical axis. Camber angle can affect tire wear, and vehicle pulling e.g., a tendency for the vehicle to go to the left or to the right without a steering input.

Front suspension systems also include a caster angle adjustment which sets the angle between a wheel's vehicle steering axis and its vertical axis when viewed from a side of the vehicle. Caster affects vehicle handling characteristics including straight line tracking and cornering. Toe angle adjustment sets the angle of the wheels relative to vehicle centerline. In all cases, the adjustments control how much of the tire, and what portion of the tire is in contact with road surfaces. The adjustments can be set for standard driving or more aggressive driving performance depending on a particular application for the vehicle.

SUMMARY

A suspension knuckle, in accordance with the present disclosure, includes an upper member including a first end configured to connect to an upper ball joint and a second end. The upper member includes a first opening at the second end and a second opening arranged between the first end and the second end. A lower member includes a first end portion configured to connect to a lower ball joint and a second end portion configured to connect with the second end of the upper member. The lower member includes a first passage arranged at the second end portion and a second passage arranged between the first end portion and the second end portion. A first fastener connects the upper member and the lower member. The first fastener passes through the first passage and the second opening. The first fastener defines a pivot point of the suspension knuckle. A second fastener connects the upper member and the lower member. The second fastener passes through the second passage and the first opening. The second fastener establishes an amount of pivot of the upper member relative to the lower member.

In other features, a cam member includes a centroid and a cam opening that extends through the cam member offset from the centroid, the second fastener including a shank passing through the cam opening.

In other features, the lower member includes a first cam stop arranged on a first side of the second passage and a second cam stop arranged on a second side of the second passage.

In other features, the first cam stop includes a first projection that extends outwardly from the lower member and the second cam stop includes a second projection that extends outwardly from the lower member.

In other features, the first cam stop defines a high camber limit and the second cam stop defines a low camber limit.

In other features, a tie rod connector extending outwardly from the lower member.

In other features, the first end of the upper member includes a first ball joint connector and a second ball joint connector, the first ball joint connector being configured to support a first ball joint and the second ball joint connector being configured to support a second ball joint.

In other features, a spindle mount is configured to support a spindle.

A vehicle, in accordance with the present disclosure, includes a body including a passenger compartment, a plurality of wheels supporting the body, and a suspension system connecting the plurality of wheels with the body. The suspension system includes an upper suspension arm, a lower suspension arm, and a suspension knuckle connected between the upper suspension arm and the lower suspension arm. The suspension knuckle includes an upper member including a first end configured to connect to an upper ball joint and a second end. The upper member includes a first opening at the second end and a second opening arranged between the first end and the second end. A lower member includes a first end portion configured to connect to a lower ball joint and a second end portion configured to connect with the second end of the upper member. The lower member includes a first passage arranged at the second end portion and a second passage arranged between the first end portion and the second end portion. A first fastener connects the upper member and the lower member. The first fastener passes through the first passage and the second opening. The first fastener defines a pivot point of the suspension knuckle. A second fastener connects the upper member and the lower member. The second fastener passes through the second passage and the first opening. The second fastener establishes an amount of pivot of the upper member relative to the lower member.

In other features, a cam member includes a centroid and a cam opening that extends through the cam member offset from the centroid, the second fastener includes a shank passing through the cam opening.

In other features, the lower member includes a first cam stop arranged on a first side of the second passage and a second cam stop arranged on a second side of the second passage.

In other features, the first cam stop includes a first projection that extends outwardly from the lower member and the second cam stop includes a second projection that extends outwardly from the lower member.

In other features, the first cam stop defines a high camber limit and the second cam stop defines a low camber limit.

In other features, a tie rod connector extends outwardly from the lower member.

In other features, the first end of the upper member includes a first ball joint connector and a second ball joint connector, the first ball joint connector being configured to support a first ball joint and the second ball joint connector being configured to support a second ball joint.

In other features, a spindle mount is configured to support a spindle.

A method of adjusting wheel camber with a suspension knuckle includes loosening a first fastener connecting an upper member of the suspension knuckle with a lower member of the suspension knuckle, loosening a second fastener connecting the upper member of the suspension knuckle with the lower member of the suspension knuckle, rotating an adjustment member supported on the second fastener causing the upper member to pivot relative to the lower member about the first fastener, establishing a selected wheel camber with the adjustment member, and tightening the first fastener and the second fastener.

In other features, rotating the adjustment member includes rotating a cam member having a cam lobe supported by the second fastener.

In other features, establishing the selected wheel camber includes sliding the second fastener within a slot by engaging the cam lobe with one of a first cam stop and a second cam stop.

In other features, engaging the cam lobe with the first cam stop sets a high wheel camber angle and engaging the second cam stop sets a low wheel camber angle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Adjusting front wheel camber typically involves adding shims to steering knuckle attachment points. For positive camber, shims are added to an upper knuckle attachment point. For negative camber, shims may be added to a lower knuckle attachment point. Changing the camber angle will often times lead to changes to caster angle and toe angle. Caster angle is often adjusted using a cam bolt while toe angle adjustments typically involve lengthening or shortening tie rod length. For this reason, adjusting a vehicle alignment takes skill and patience.

Figure 1:
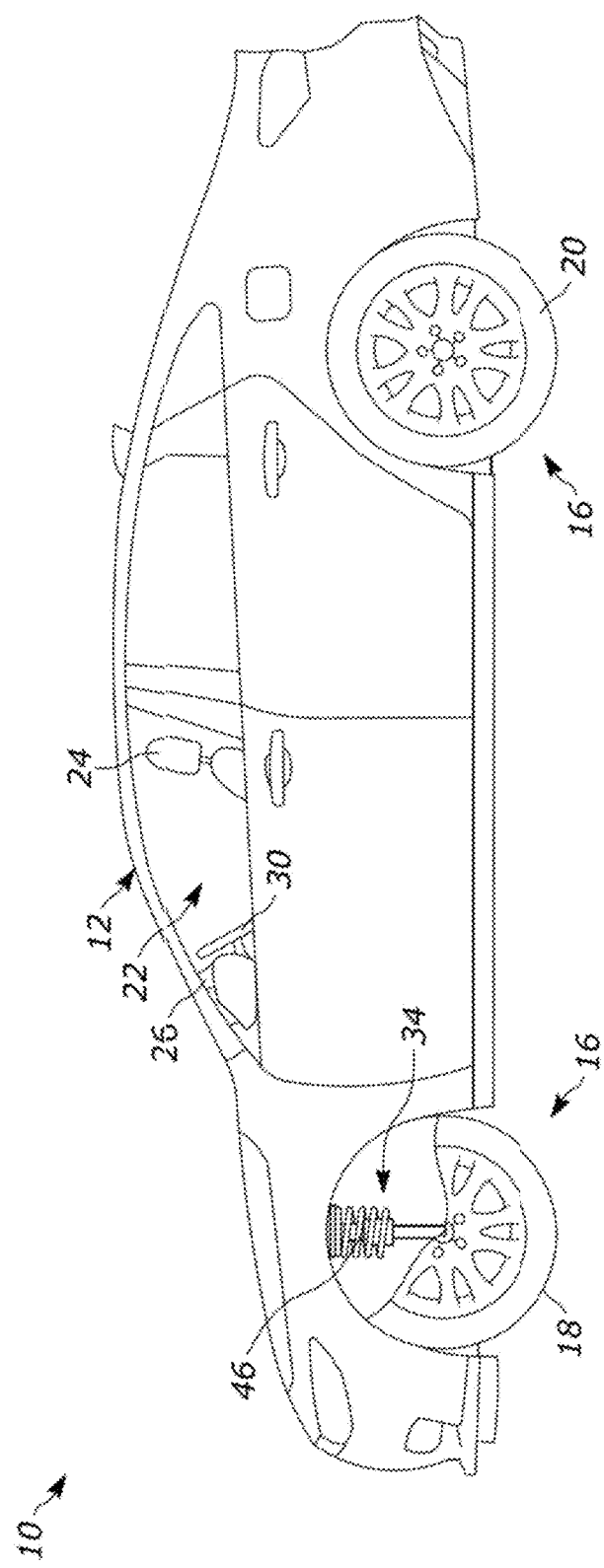
FIG. 1 is a left side view of a vehicle including a suspension system having an adjustable knuckle, in accordance with the present disclosure.

A vehicle, in accordance with the present disclosure, is indicated generally at 10 in FIG. 1. Vehicle 10 includes a body 12 supported on frame (not shown) which, in turn, is supported by a plurality of wheels 16. Plurality of wheels 16 includes front wheels 18 and rear wheels 20. Body 12 defines, in part, a passenger compartment 22 within which is arranged a plurality of seats, one of which is indicated at 24. Seat 24 is positioned behind a dashboard 26. A steering wheel 30 is arranged between dashboard 26 and seat 24. Body 12 is connected to plurality of wheels 16 through a suspension system 34. Suspension system 34 is designed to support body 12 and accommodate various road conditions to provide a comfortable ride.

Figure 2:
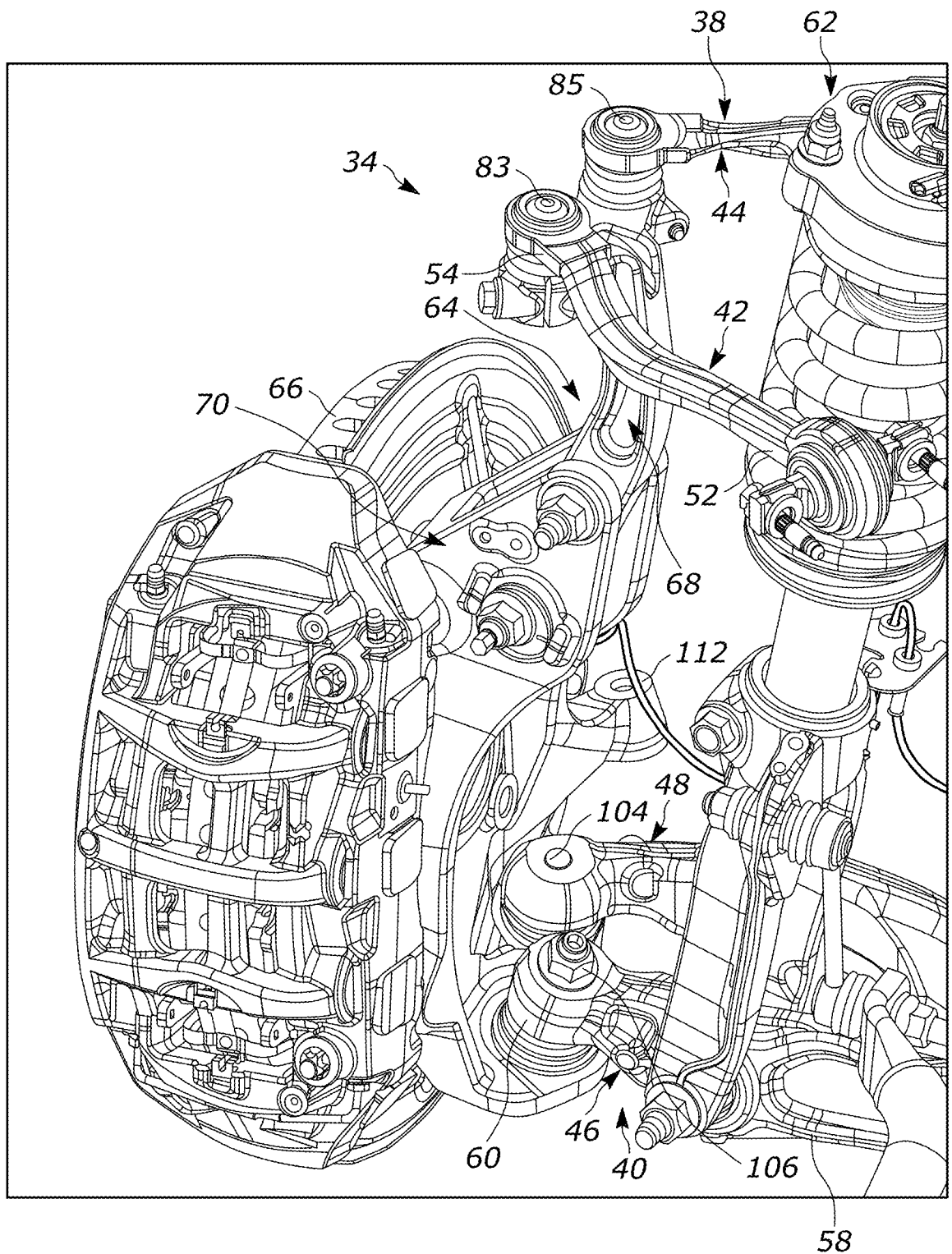
FIG. 2 is a perspective view of a right side of the suspension system of FIG. 1 illustrating the adjustable knuckle, in accordance with the present disclosure.

Suspension system 34 defines a right side front suspension system 34. The left side front suspension system (not shown) is similarly formed. Referring to FIG. 2, suspension system 34 includes an upper suspension member 38 and a lower suspension member 40 that form a resilient controllable connection between the frame and front wheels 18. Upper suspension member 38 includes a first suspension component 42 and a second suspension component 44. Lower suspension member 40 includes a first suspension element 46 and a second suspension element 48.

First suspension component 42 of upper suspension member 38 includes a first end section 52 and a second end section 54. First end section 52 is operatively connected to the vehicle frame. Second suspension component 44 is similarly formed. First suspension element 46 includes a first end segment 58 and a second end segment 60. First end segment 58 is also operatively connected to the vehicle frame. More specifically, first end segment 58 is pivotally connected to the vehicle frame. First suspension component 46 is also operatively connected to the vehicle frame through a hydraulic strut 62. Hydraulic strut 62 is connected to first suspension component 46 between first end segment 58 and second end segment 60. Hydraulic strut 62 may also be connected to vehicle body 12.

A suspension knuckle 64 is connected between upper suspension member 38 and lower suspension member 40. As will be detailed more fully herein, suspension knuckle 64 is also operatively connected to a rotor 66 that supports one of front wheels 18. In this manner, suspension knuckle 64 supports and positions the one of the front wheels 18 as will also be detailed more fully herein.

Figure 3:
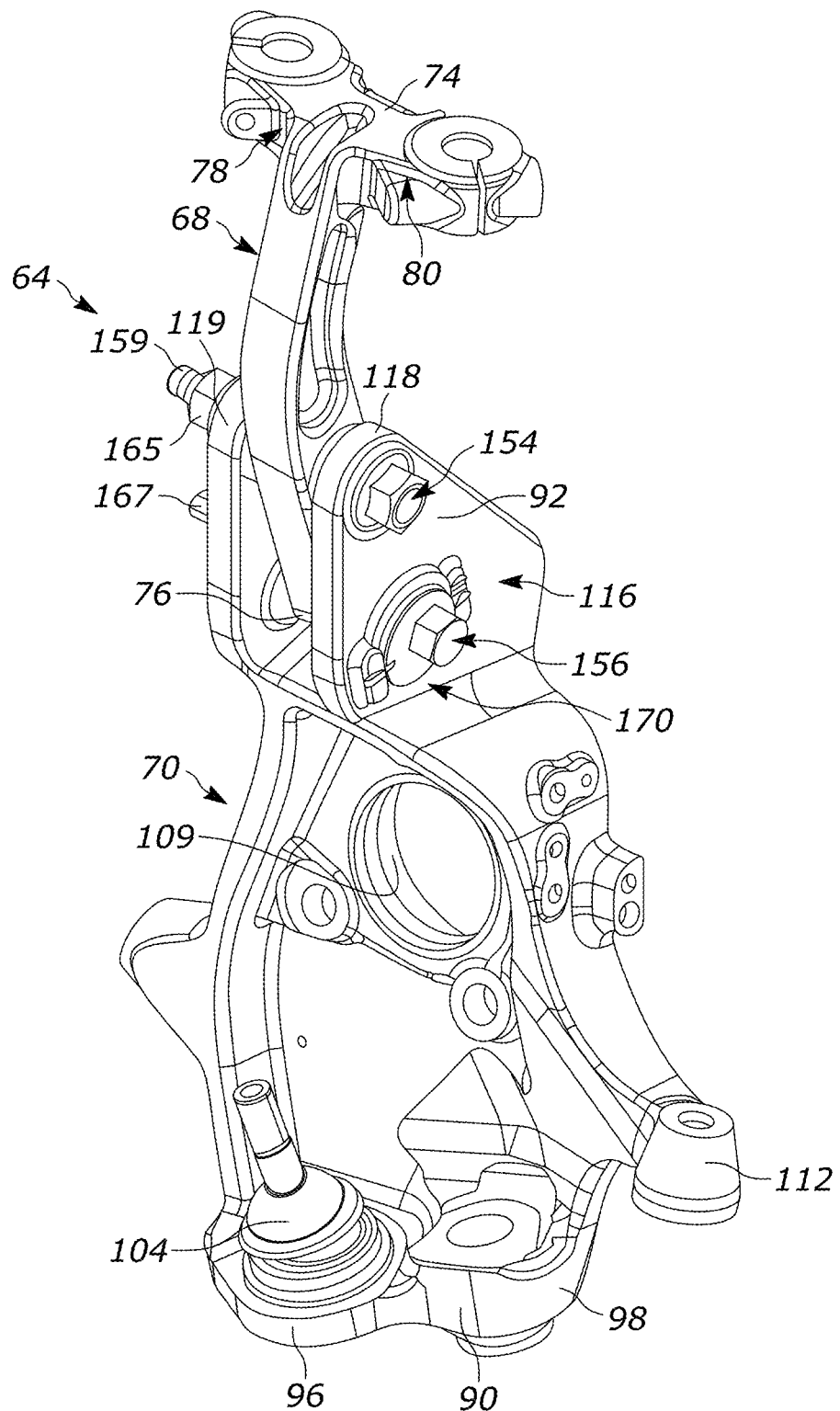
FIG. 3 is a perspective view of the adjustable knuckle of FIG. 2, in accordance with the present disclosure.
Figure 4:
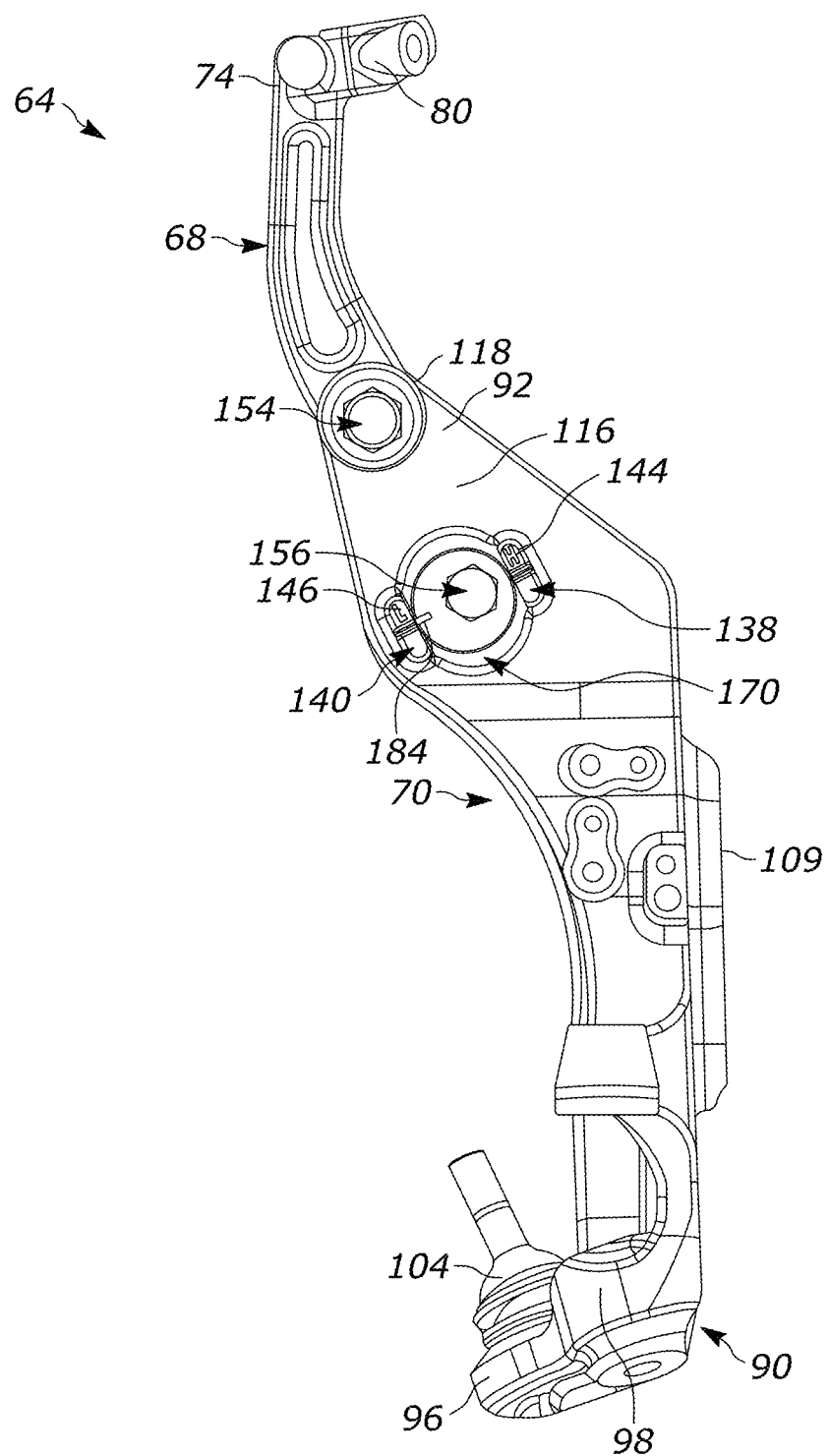
FIG. 4 is a front side elevational view of the adjustable knuckle of FIG. 3, in accordance with the present disclosure.
Figure 5:
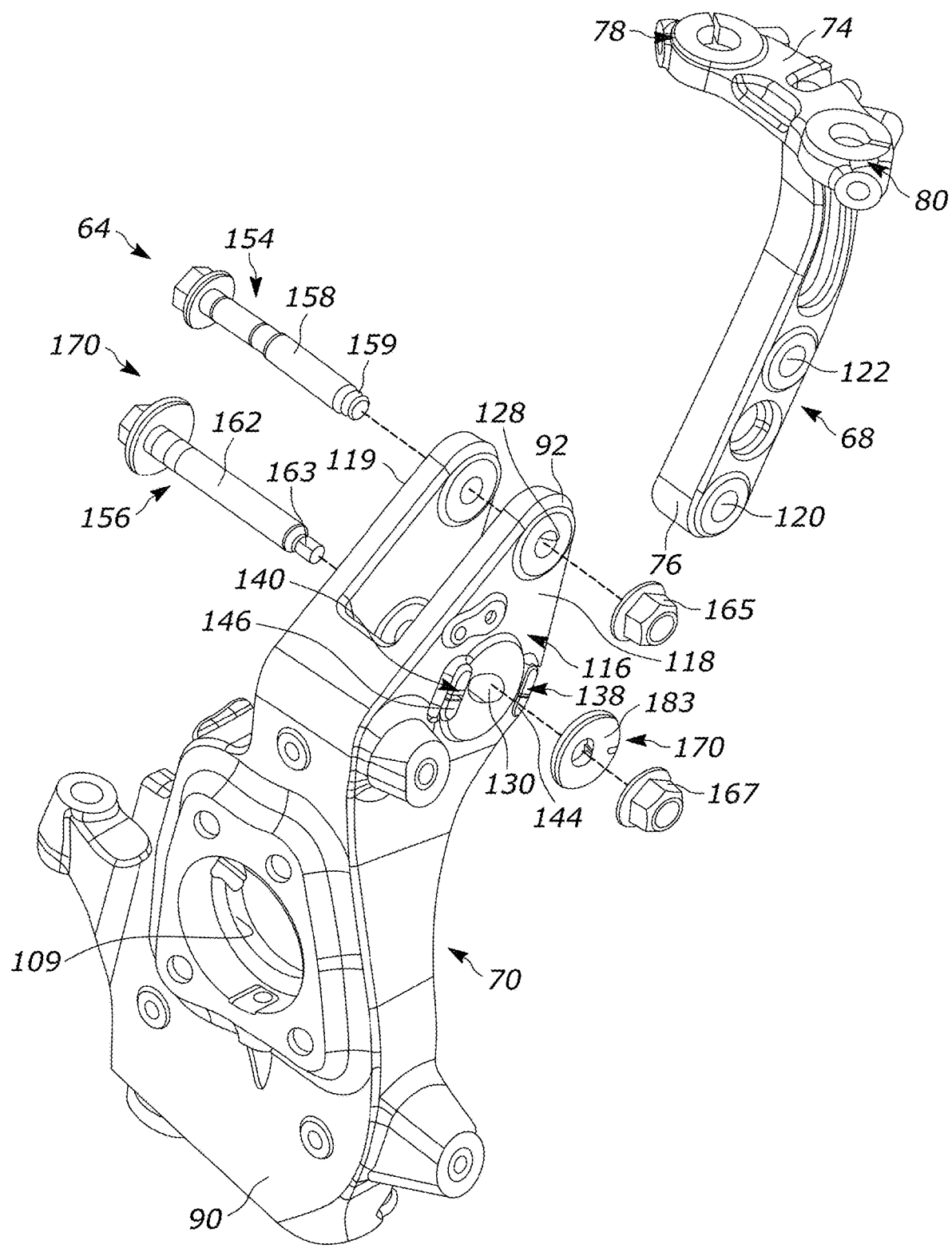
FIG. 5 is a disassembled view of the adjustable knuckle of FIG. 3 illustrating an upper member, a lower member, a first fastener, and a cam bolt, in accordance with the present disclosure.

Referring to FIGS. 3, 4, and 5, and with continued reference to FIG. 2, suspension knuckle 64 includes an upper member 68 pivotally connected to a lower member 70. Upper member 68 includes a first end 74 and a second end 76. First end 74 includes a first upper ball joint connector 78 and a second upper ball joint connector 80. First upper ball joint connector 78 supports a first upper ball joint 83 and second upper ball joint connector 80 supports a second upper ball joint 85 as shown in FIG. 2.

First upper ball joint 83 and second upper ball joint 85 serve as an interface with second end section 54 of first suspension component 42 and the second end section (not separately labeled) of second suspension component 44 of upper suspension member 38. Second end 76 connects with lower member 70 as will be detailed more fully herein.

Lower member 70 includes a first end portion 90 and a second end portion 92. First end portion 90 includes a first lower ball joint connector 96 and a second lower ball joint connector 98 which serve as an interface with lower suspension member 40 as will be detailed herein. Second end portion 92 connects with upper member 68 as also be detailed more fully herein.

As also shown in FIGS. 3 and 4 and with continued reference to FIG. 2, a first lower ball joint 104 relates to first lower ball joint connector 96 and a second lower ball joint 106 is connected to second lower ball joint connector 98. First lower ball joint 104 and second lower ball joint 106 serve as an interface with second end segment 60 of first suspension element 46 and the second end segment (not separately labeled) of second suspension element 48. Lower member 70 is further shown to include a spindle mount 109 configured to connect with a wheel spindle (not shown) and a tie rod support 112. The wheel spindle supports rotor 66 through one or more bearings (also not shown).

Figure 6:
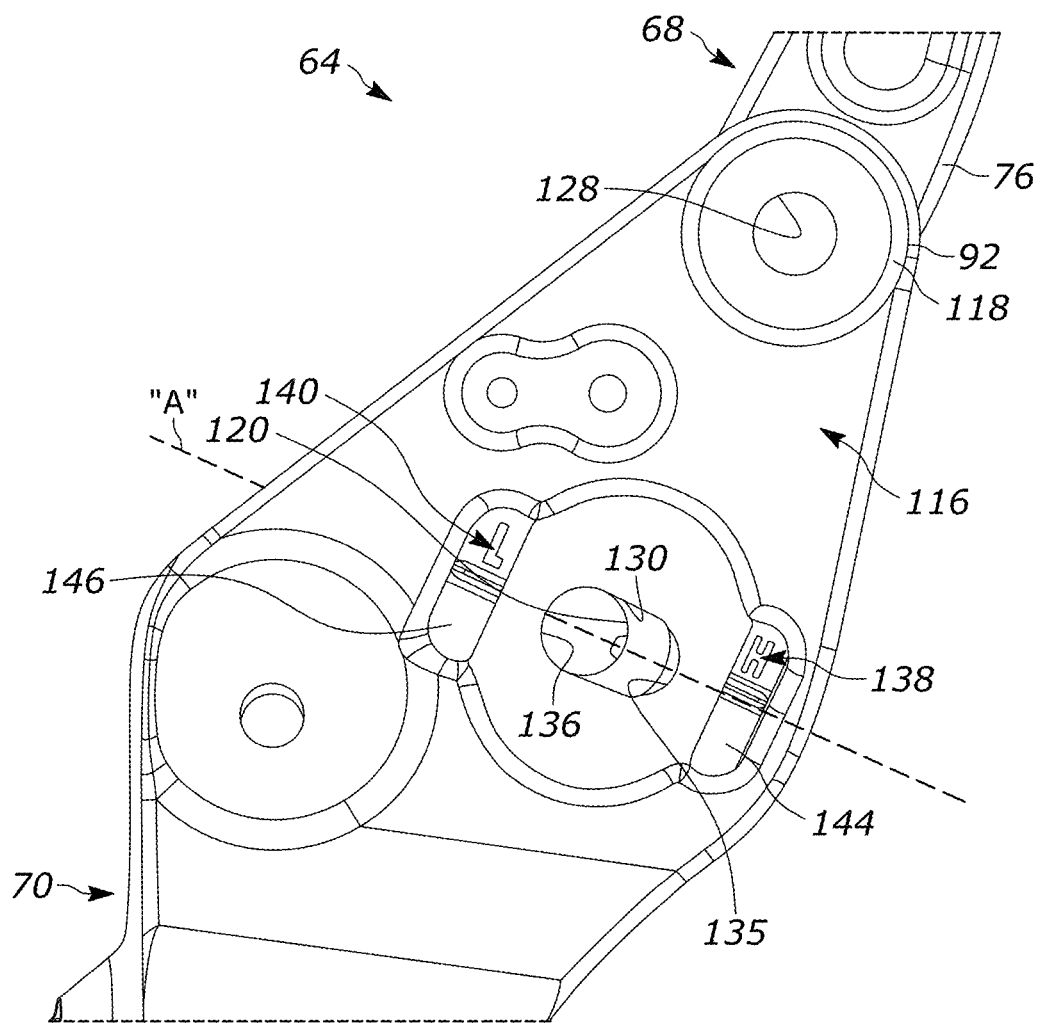
FIG. 6 is an elevational view of an interface between the upper member and the lower member without the first fastener and the cam bolt, in accordance with the present disclosure.

Second end portion 92 of lower member 70 defines an interface region 116 with upper member 68. Interface region 116 includes a first support 118 and a second support 119. First support 118 is spaced from second support by a gap (not separately labeled) that is receptive of second end 76 of upper member 68. As shown in FIGS. 5 and 6, second end 76 of upper member 68 includes a first opening 120. A second opening 122 is spaced from first opening 120 towards first end 74. Second end portion 92 of lower member 70 includes a first passage 128. A second passage 130 is spaced from first passage 128 towards first end portion 90. First passage 128 is substantially circular while second opening 134 is elongated having a first end region 135 and a second end region 136 spaced along an adjustment axis "A" as shown in FIG. 6.

A first cam stop 138 is arranged adjacent to first end region 135 and a second cam stop 140 is arranged adjacent to second end region 136. First cam stop 138 is defined by a first projection 144 extending outwardly of interface region 116. Second cam stop 140 is defined by a second projection (also not separately labeled) extending outwardly of interface region 116. First projection 144 defines a first camber adjustment limit and second projection 146 defines a second camber adjustment limit as will be detailed more fully herein.

A first fastener 154 passes through first passage 128 and first opening 120 joining upper member 68 to lower member 70. First fastener 154 defines a pivot axis for upper member 68. Upper member 68 may pivot relative to lower member 70 about the pivot axis. A second fastener 156 passes through second passage 130 and second opening 122. Second fastener 156 transitions between first end region 135 and second end region 136 defining an amount of pivot of upper member 68 relative to lower member 70. First fastener 154 includes a first shank 158 and a first threaded region 159. Second fastener 156 includes a second shank 162 and a second threaded region 163. A first nut 165 connects with first threaded region 159 on first fastener 154 and a second nut 167 connects with second threaded region 163 on second fastener 156.

Figure 7:
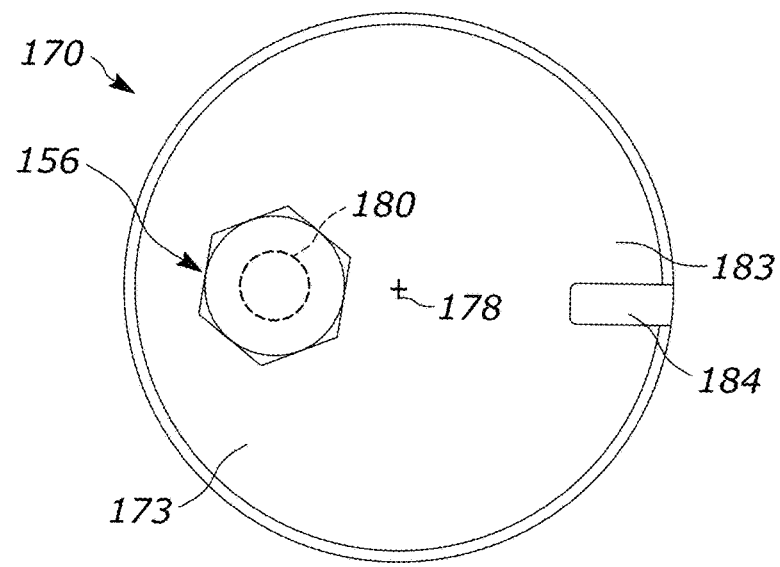
FIG. 7 is an elevational view of a cam member associated with the second fastener, in accordance with the present disclosure.

A cam member 170 is connected to second fastener 156 and rotated against first cam stop 138 and/or second cam stop 140 to set an amount of camber for the one of front wheels 18 connected to suspension knuckle 64. As shown in FIG. 7, cam member 170 includes a substantially circular body 173 having a centroid 178 and an opening 180. Opening 180 is receptive of second fastener 156 and is spaced from centroid 176 so as to form a cam lobe 183. Cam member 170 also includes a position indicator 184.

Figure 8:
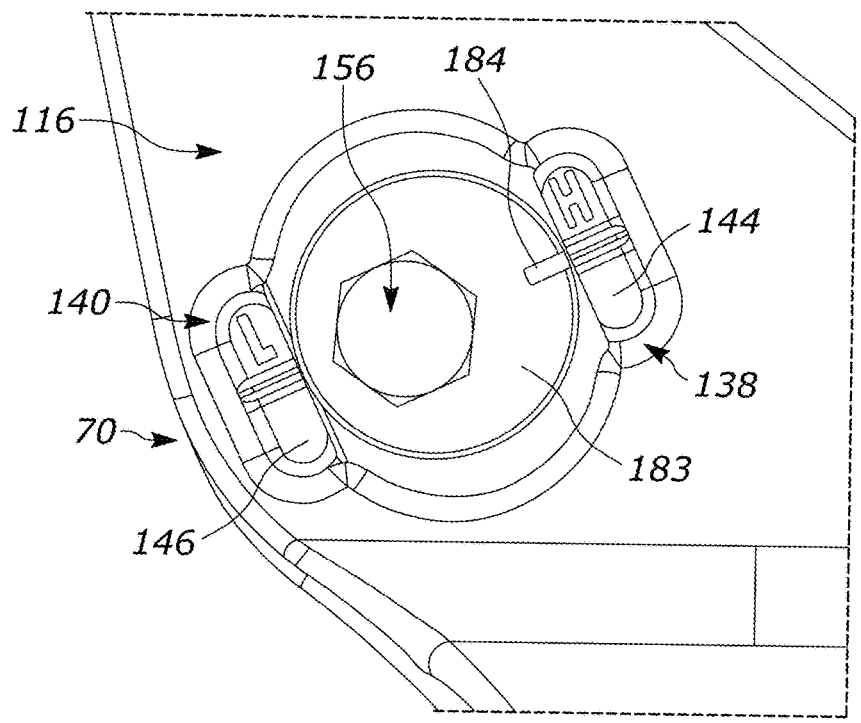
FIG. 8 is a plan view of the cam bolt in a high camber adjustment configuration, in accordance with the present disclosure.

In accordance with the present disclosure, in order to adjust camber, first nut 165 and second nut 167 are loosened. Once loosened, a tool may be engaged with second fastener 156. Second fastener 156 is rotated such that cam lobe 183 engages with first cam stop 138 causing upper member 68 to pivot about first fastener 154 in a first direction. When position indicator 184 aligns with first cam stop, a high camber angle is set as shown in FIG. 8.

Figure 9:
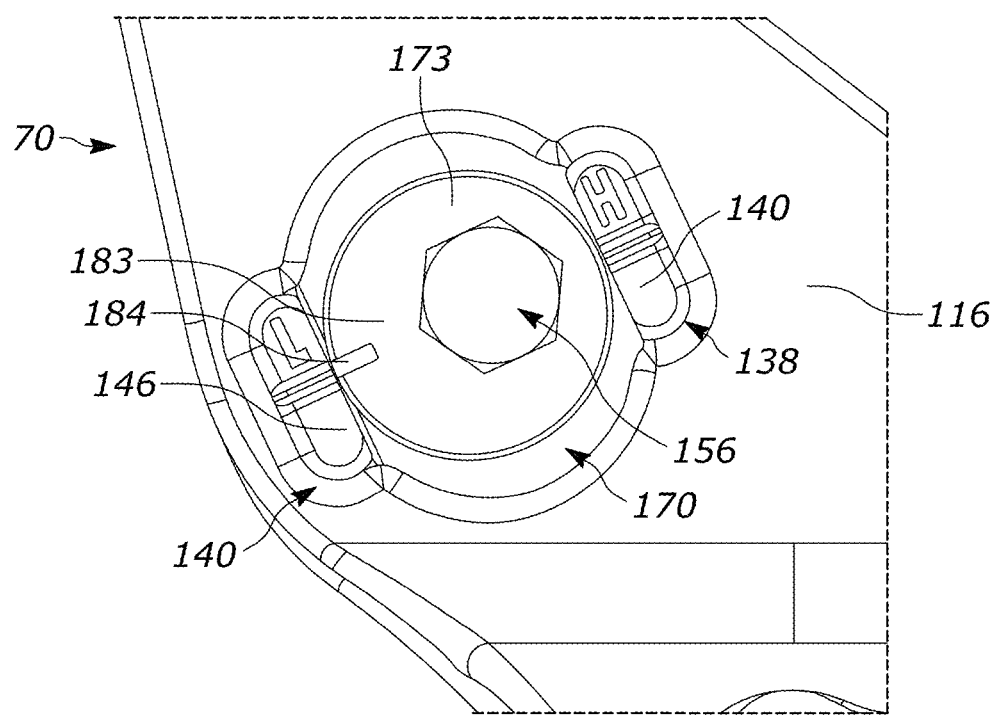
FIG. 9 is a plan view of the cam bolt in a low camber adjustment configuration, in accordance with the present disclosure.

Fastener 156 may be rotated in an opposite direction causing cam lobe to, for example, engage second cam stop 140 causing upper member 68 to pivot about first fastener 154 in a second direction, opposite the first direction. When position indicator 184 aligns with second cam stop 140 so as to set a low camber angle is set such as shown in FIG. 9. Second fastener 156 may be rotated such that cam lobe 183 is positioned between first cam stop 138 and second cam stop 140 to set a camber angle that is between the high camber angle and the low camber angle. Once the desired camber angle is achieved, first nut 165 and second nut 167 are tightened. At this point, camber angle may be set in a similar manner for others of the plurality of wheels 16. That is while shown as being a front steering knuckle, suspension knuckle 64 may be associated with any one of the plurality of wheels 16.

At this point it should be understood that the suspension knuckle in accordance with the present disclosure enables an easily achieved camber adjustment without the need to try different shims or manipulate multiple members. Further, by changing the angle between the upper member and the lower member to adjust camber angle, other alignment criteria are only minimally affected. That is, adjusting camber angle by pivoting the upper member relative to the lower member results in a minima change to caster angle and toe angle. As such, a proper alignment may be achieved quickly and with minimal need for additional adjustments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A suspension knuckle comprising:
   an upper member including a first end configured to connect to an upper ball joint and a second end, the upper member including a first opening at the second end and a second opening arranged between the first end and the second end;
   a lower member including a first end portion configured to connect to a lower ball joint and a second end portion configured to connect with the second end of the upper member, the lower member including a first passage arranged at the second end portion and a second passage arranged between the first end portion and the second end portion;
   a first fastener connecting the upper member and the lower member, the first fastener passing through the first passage and the second opening, the first fastener defining a pivot point of the suspension knuckle; and
   a second fastener connecting the upper member and the lower member, the second fastener passing through the second passage and the first opening, the second fastener establishing an amount of pivot of the upper member relative to the lower member.

2. The suspension knuckle according to claim 1, further comprising a cam member including a centroid and a cam opening that extends through the cam member offset from the centroid, the second fastener including a shank passing through the cam opening.

3. The suspension knuckle according to claim 2, wherein the lower member includes a first cam stop arranged on a first side of the second passage and a second cam stop arranged on a second side of the second passage.

4. The suspension knuckle according to claim 3, wherein the first cam stop includes a first projection that extends outwardly from the lower member and the second cam stop includes a second projection that extends outwardly from the lower member.

5. The suspension knuckle according to claim 3, wherein the first cam stop defines a high camber limit and the second cam stop defines a low camber limit.

6. The suspension knuckle according to claim 1, further comprising a tie rod connector extending outwardly from the lower member.

7. The suspension knuckle according to claim 1, wherein the first end of the upper member includes a first ball joint connector and a second ball joint connector, the first ball joint connector being configured to support a first ball joint and the second ball joint connector being configured to support a second ball joint.

8. The suspension knuckle according to claim 1, further comprising a spindle mount configure to support a spindle.

9. A vehicle comprising:
   a body including a passenger compartment;
   a plurality of wheels supporting the body; and
   a suspension system connecting the plurality of wheels with the body, the suspension system including an upper suspension arm, a lower suspension arm, and a suspension knuckle connected between the upper suspension arm and the lower suspension arm, the suspension knuckle comprising:
      an upper member including a first end configured to connect to an upper ball joint and a second end, the upper member including a first opening at the second end and a second opening arranged between the first end and the second end;
      a lower member including a first end portion configured to connect to a lower ball joint and a second end portion configured to connect with the second end of the upper member, the lower member including a first passage arranged at the second end portion and a second passage arranged between the first end portion and the second end portion;
      a first fastener connecting the upper member and the lower member, the first fastener passing through the first passage and the second opening, the first fastener defining a pivot point of the suspension knuckle; and
      a second fastener connecting the upper member and the lower member, the second fastener passing through the second passage and the first opening, the second fastener establishing an amount of pivot of the upper member relative to the lower member.

10. The vehicle according to claim 9, further comprising a cam member including a centroid and a cam opening that extends through the cam member offset from the centroid, the second fastener including a shank passing through the cam opening.

11. The vehicle according to claim 10, wherein the lower member includes a first cam stop arranged on a first side of the second passage and a second cam stop arranged on a second side of the second passage.

12. The vehicle according to claim 11, wherein the first cam stop includes a first projection that extends outwardly from the lower member and the second cam stop includes a second projection that extends outwardly from the lower member.

13. The vehicle according to claim 11, wherein the first cam stop defines a high camber limit and the second cam stop defines a low camber limit.

14. The vehicle according to claim 9, further comprising a tie rod connector extending outwardly from the lower member.

15. The vehicle according to claim 9, wherein the first end of the upper member includes a first ball joint connector and a second ball joint connector, the first ball joint connector being configured to support a first ball joint and the second ball joint connector being configured to support a second ball joint.

16. The vehicle according to claim 9, further comprising a spindle mount configured to support a spindle.

17. A method of adjusting wheel camber with a suspension knuckle comprising:

loosening a first fastener connecting an upper member of the suspension knuckle with a lower member of the suspension knuckle;

loosening a second fastener connecting the upper member of the suspension knuckle with the lower member of the suspension knuckle;

rotating an adjustment member supported on the second fastener causing the upper member to pivot relative to the lower member about the first fastener;

establishing a selected wheel camber with the adjustment member; and tightening the first fastener and the second fastener.

18. The method of claim 17, wherein rotating the adjustment member includes rotating a cam member having a cam lobe supported by the second fastener.

19. The method of claim 18, wherein establishing the selected wheel camber includes sliding the second fastener within a slot by engaging the cam lobe with one of a first cam stop and a second cam stop.

20. The method of claim 19, wherein engaging the cam lobe with the first cam stop sets a high wheel camber angle and engaging the second cam stop sets a low wheel camber angle.

* * * * *